FIG.1

Oct. 17, 1967 P. J. COOLE 3,347,339
CRADLES USED ON BUILDINGS AND THE CONTROL
AND INSTALLATION THEREOF
Filed Oct. 18, 1965 9 Sheets-Sheet 6

INVENTOR
PETER J. COOLE

United States Patent Office 3,347,339
Patented Oct. 17, 1967

3,347,339
CRADLES USED ON BUILDINGS AND THE CONTROL AND INSTALLATION THEREOF
Peter J. Coole, Bickley, England, assignor to Cradle Runways Limited, London, England, a British company
Filed Oct. 18, 1965, Ser. No. 496,946
Claims priority, application Great Britain, Oct. 20, 1964, 42,807/64
14 Claims. (Cl. 182—14)

ABSTRACT OF THE DISCLOSURE

A system for safe operation of cradles suspended on buildings by cables leading from a winding drum in a trolley which traverses the top of the building. The building face has vertical rows of sockets sequentially engaged as the cradle descends by plugs carried in the cradle and having rings through which pass the cables. Each engagement operates a switch enabling the cradle to descend only to the next socket, thus always limiting the free cable length on which the cradle can swing. Electrical interlocks prevent simultaneous operation of the trolley traversing and cradle winding motors.

---

This invention relates to cradles and trolleys such as are used on buildings and the control and installation thereof, such cradles being used for window-cleaning and maintenance purposes or for use in similar circumstances. Where we refer to "buildings" we include other situations which present similar problems. It is to cradles which are slung by spaced cables, and which are for use especially on high buildings, that the invention particularly applies. In the use of such cradles various hazards are involved and precautions have to be taken to meet them. One such hazard is the swinging of the cradle by the wind. Another factor which has to be taken into account is that winding machinery used for lowering and raising a cradle must be kept under careful control and supervision. If there be traversing gear, such as is nowadays provided as a virtually permanent installation on large buildings, the cradle is, in effect, required to be operated in specified vertical "tracks" and in all planes of its operation must remain under the same conditions of safety.

The invention seeks to provide means whereby the requirements of cradle operation are complied with both as to the safety of personnel and as to control of operation.

According to the invention a cable-suspended cradle system has a suspension cable having slidably and restrainably mounted upon it a plurality of restrictive and guiding attachment elements which are adapted to stack one upon another on the cable, each of which is adapted to be engaged with one element of a vertically-spaced series of complementary attachment elements fixedly mounted on the building.

Further according to the invention the system has an electric motor driven winding drum; the control means of which include electrical contact means operated in consequence of release or engagement of a pair of the attachment elements and so that the electric motor can only be energised when the cradle is below the lowest positioned restriction against swinging. It will be understood that the lowest positioned restriction includes that restriction which is operative when the cradle is in its highest position.

The attachment elements on the cable are conveniently in the form of plugs and the complementary elements are in the form of sockets. When the cradle is at its highest these plugs stack one on top of the next on the cable, and as the cable is paid out to lower the cradle, the topmost plug is engaged with the next in series of the sockets, whereby the cable—by virtue of the ring of the last plug engaged—is restrained as from the last socket and the cradle therefore has a freedom of swing which is limited by the comparatively short length above it and below the last-engaged plug and socket.

In practice, for example, there will be a socket every 50 feet (vertically) down the wall and the cradle therefore never has more than 50 feet of cable upon which it could swing.

Thus the engagement of a plug and a socket is necessary in order to cut in the motor control means of the winding motor. This is to the effect that (in the example) the winding motor will only lower the cradle through 50 feet and then cuts out automatically, and remains cut out until the next plug and socket are engaged, whereupon a further 50 feet of drop becomes available, and so on through the required working height. Conversely, in hoisting, the winding will stop at each 50-foot level until the plug and socket there located are disengaged.

Preferably, the cradle carries two sets of plugs, one at each end. A corresponding plug from each set must be engaged in its appropriate socket before the winding motor can be operated.

The winding motor and drum are located in a trolley which has a separate traversing motor and which runs along the upper margin of the wall of the building. In the case of a very tall building several independent systems may be provided, one above another, in which case the term "upper margin" applies to the vertical position of each independent trolley.

The invention further includes the provision in the face of the building of a second series of sockets mounted in a horizontal row at the top of the building, one of these sockets being positioned midway between each vertical series of the first series of sockets described above. A wander plug carried on a lead attached to the trolley is engaged with one of this second series of sockets by an operator in the cradle when the trolley has been traversed to the desired position. This engagement energises the winding motor circuits, thus enabling the operator to control the winding motor, and at the same time cuts out the traversing motor, so making it impossible for this motor to be operated except when the cradle is at its uppermost position and adjacent to the trolley. Similarly, when such plug is disengaged the operator can control the traversing motor but the winding motor is now cut out of circuit.

Both the traversing and winding motors are preferably operated by push-button control mounted in the cradle. These controls are connected electrically to the trolley by means of an independent electric cable which may also be combined with a second cable for the provision of any electric services which may be required in the cradle. Electrical circuitry may also be provided in the building so as to over-ride the safety measures and thus enable the cradle to be operated by a person in the building in the event of an emergency such as illness on the part of the operators in the cradle.

The invention also includes a pulse sequence impulse system so that any required number of operations can be initiated using only a three-core cable between the cradle and the trolley. The three-core cable may be wound onto a separate drum mounted in the trolley.

The invention will now be further described by way of example with reference to the accompanying drawings, in which.

Figure 1:
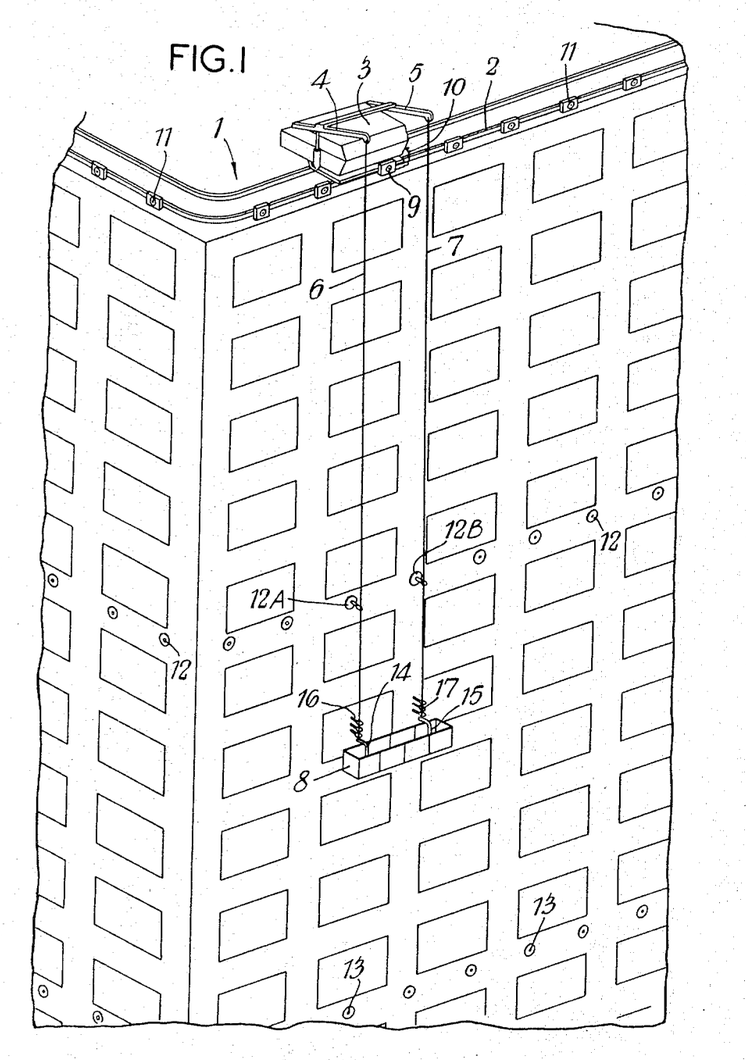
FIGURE 1 is a sketch of a building equipped with one embodiment of a system according to the invention.

Referring to the drawings, 1 shows a general perspective view of the face of a building. A track 2 is fitted to the top of the building and a trolley 3 runs along this track. Two arms 4 and 5 project from the trolley and act as guides for two cables 6 and 7. The upper ends of these cables are attached to a drum inside the trolley and operated by a winding motor and a cradle 8 is slung from the lower end of the cables 6 and 7. The trolley 3 also contains a traversing motor. A wander plug 9 is carried on the end of a lead 10 attached to the trolley and can be engaged with any one of a series of sockets 11 fitted to the building in a horizontal row in the proximity of the track 2.

At a distance of, for example, 50 feet below the top of the building another row of sockets 12 is fitted to the building and below this row there is another row of sockets 13. Similar rows of sockets are provided at vertical intervals of 50 feet all the way down the face of the building. The rows 12, 13, etc., are aligned so that the sockets also lie in precise vertical rows spaced apart by the same distance as that between the arms 4 and 5 and the topmost sockets 11, which fulfill a different function from the other rows of sockets, are located midway between these vertical rows.

Two arms 14 and 15 are attached to the cradle 8, one arm being near each end of the cradle, and these arms are spaced at a distance exactly equal to the distance between any two adjacent vertical rows of the sockets 12, 13, etc. The cables 6 and 7 are attached to the upper ends of the arms 14 and 15 and each cable carries at its lower end a number of plugs such as 16 and 17. These plugs carry rings at one end, through which the cables pass and are designed so as to fit into the sockets 12, 13, etc. The number of plugs on each cable is equal to the number of sockets in each vertical row. When not in use the plugs lie approximately parallel to the face of the building and any plug must thus be swung through an angle of 90° before it can be engaged in a socket.

Figure 2:
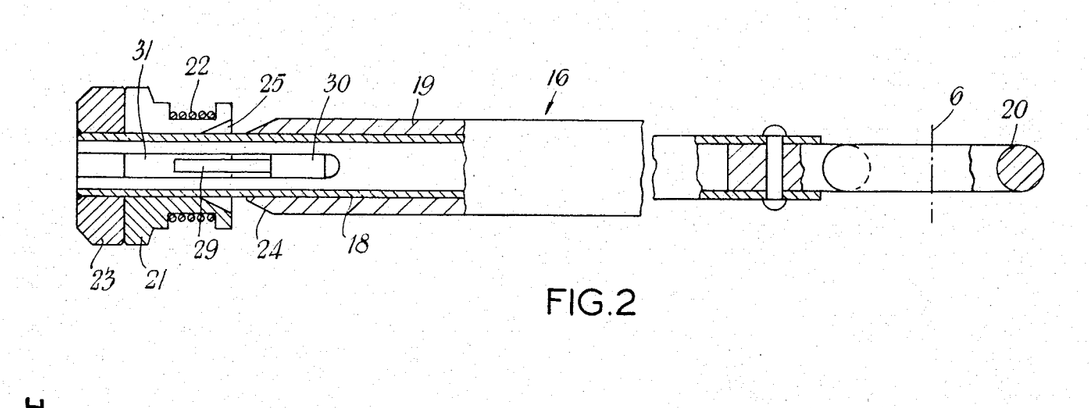
FIGURE 2 is a cross-section of a plug.
Figure 3:
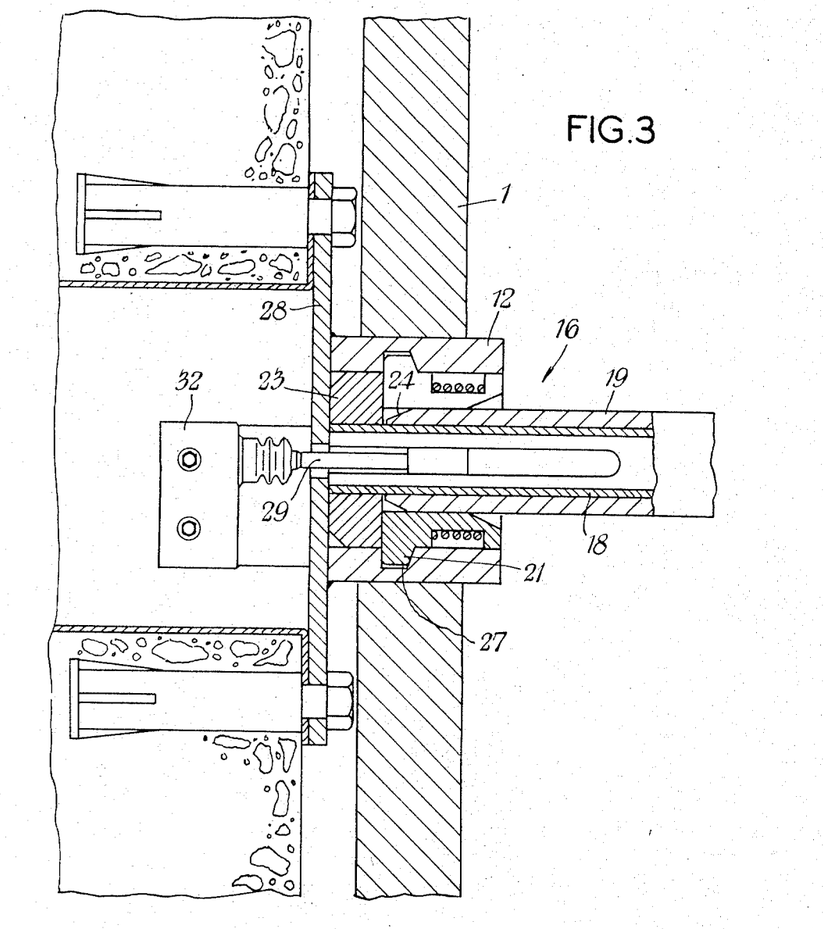
FIGURE 3 is a cross-section of a socket with a plug engaged therein.

The plugs 16, 17 and the sockets 12, 13, etc., are shown in cross-section in FIGURES 2 and 3. The plug 16 has an inner tube 18 over which slides an outer tube 19. The outer end of the tube 18 carries a ring 20 through which passes the cable 6 and the inner end carries three split collets, one of which is shown at 21. The collets are enclosed by a spring 22.

A socket 12 is shown attached to the building 1, the inner diameter of the socket being such as to admit the collets 21 when these collets are in their innermost radial position. When the inner tube 18, carrying the collets, has been pushed fully home into the socket 12, the outer tube 19 is slid in a direction towards the collets. The inner end of the tube 19 is tapered as shown at 24 and this taper enters tapered recesses, one of which is shown at 25, formed in the base of the collets. On further sliding of the tube 19, this tube enters the internal space now formed between the collets and the inner tube, thus forcing the collets apart so causing a flange formed on the inner end of the collets to engage a corresponding recess 27 in the socket 12. The plug 16 is thus locked into the socket and cannot be dislodged by a pull on the cable. When the inner tube is fully home, its inner end together with a shoulder 23 abuts against a member 28 carried on the building.

A central spigot 29 is attached to the outer tube 19 by means of members 30 which pass through slots 31 formed in the wall of the inner tube 18. When the outer tube is slid into position so as to lock the collets into the recesses, the end of the spigot 29 engages and operates a micro-switch 32 attached to the building.

The trolley 3 and cradle 8 are controlled from the cradle by push-buttons connected to an independent electric cable (not shown) extending from the trolley to the cradle. To describe the operation of the apparatus, assume the cradle to be at the top and the wander plug 9 disengaged. This disengagement cuts the cradle winding motor out of circuit and the operator in the cradle is only able to operate the trolley traversing motor. He traverses the trolley to the desired position, which must be such that the arms 4 and 5 are each directly above a vertical row of sockets, and then inserts the plug 9 into one of the sockets 11. This action cuts the traversing motor out of circuit and simultaneously prepares the winding motor circuits for operation by the push-buttons in the cradle. On pressing the "down" button the cradle will descend for, in this example, 50 feet and will then automatically come to rest, the winding motor being cut out of circuit by means of limit switches operated by the winding drum. If the operator in the cradle now pressed the "up" button the cradle will rise to the top again but the "down" button will be inoperative. If the operator wishes to descend to the next level he must take the uppermost pair of plugs 16 and 17, turn them through 90° and insert each of them into the appropriate socket 12 as shown at 12A and 12B in FIGURE 1. When both plugs are fully home the "up" button will be inoperative but on pressing the "down" button the cradle will descend to the next 50 foot level at which point the winding drums limit switch will again automatically stop the winding motor. To descend to the next level, the next pair of plugs 16 and 17 (now of course the uppermost on the cables) must be inserted into two of the sockets 13. This process can be repeated all the way down the face of the building. The operator may of course also halt the cradle at any intermediate vertical point between the sockets. To bring the cradle up again the operator removes the two plugs at the level at which he happens to be. On pressing the "up" button, the cradle will rise through 50 feet and stop automatically. The operator now removes both the plugs at this level and presses the "up" button for the next 50 feet ascent. It will be seen that at any level, if the two plugs are removed the cradle cannot be lowered but can be raised to the next level. When the plugs are inserted the cradle cannot be raised but can be lowered to the next level but no further. Thus, whatever the operator may do, the cradle cannot be free to swing on a length of cable of more than 50 feet since at this height above the cradle the cables will be restrained by the presence of the rings.

Figure 4:
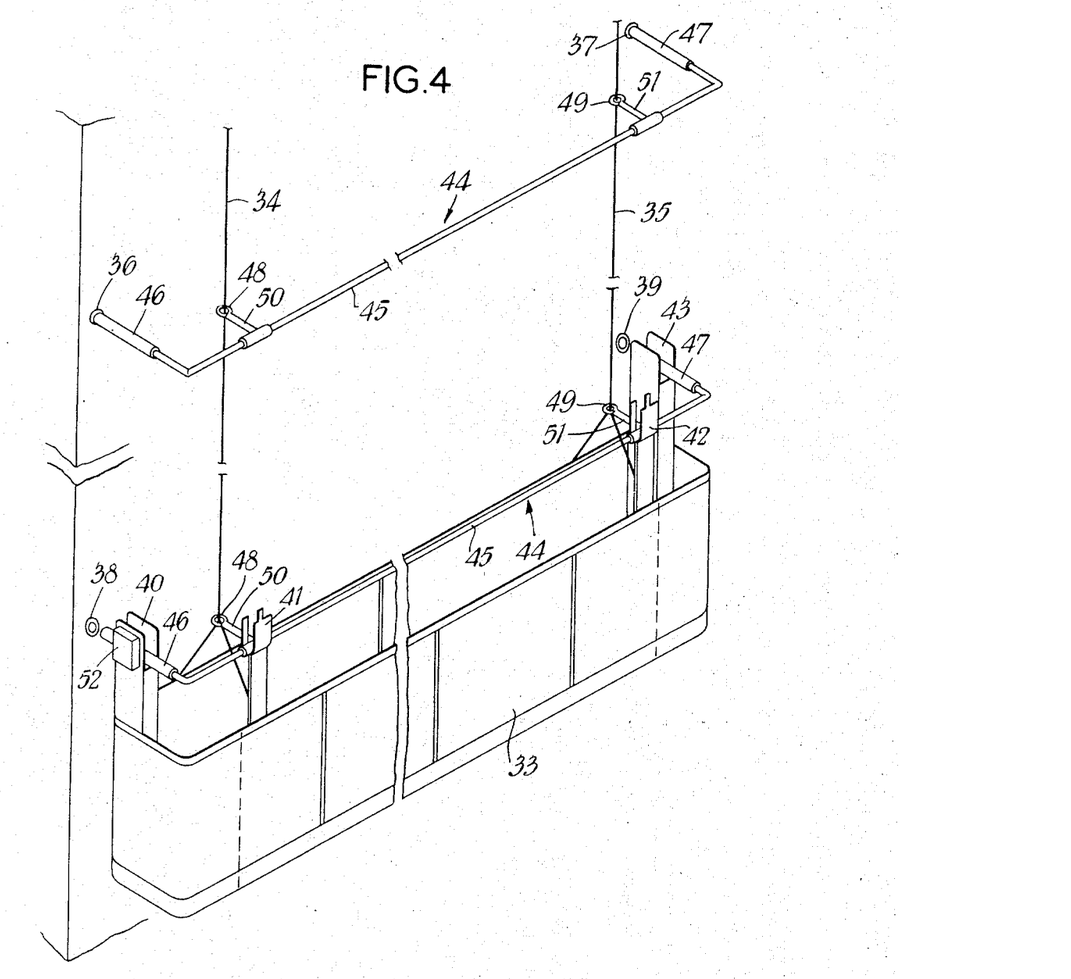
FIGURE 4 is a diagrammatic view of a modified embodiment of the invention.

Referring now to FIGURE 4, in a modified arrangement a cradle 33 is shown supported by two cables 34 and 35. The upper ends of these cables pass over slewable jibs carried by a trolley (not shown) running on a track fitted to the top of the building and are then attached to a winding drum inside the trolley. The trolley also carries electric motors for hoisting and traversing purposes.

The face of the building is equipped with vertical rows of sockets, four of these sockets being shown at 36, 37, 38 and 39. The horizontal distance between adjacent rows is approximately equal to the length of the cradle, whilst the vertical distance between adjacent sockets is, in this example, 50 feet.

The cradle carries four U-shaped brackets 40, 41, 42 and 43, each bracket being deep enough to carry a number of restraining devices equal to the number of sockets in each vertical row. Two of these restraining devices are shown at 44. Each restraining device comprises a horizontal bar 45 of a length equal to the distance between two adjacent vertical rows of sockets and carries at each end plugs 46 and 47 for engagement with two adjacent sockets. The distance between the cables 34 and 35 is slightly less than the distance between adjacent sockets so that the cables can pass through restraining rings such as 48 and 49, these rings being carried by arms 50 and 51 attached to the bar 45.

The brackets 40 and 43 each carry a micro-switch, one of which can be seen at 52, and the micro-switches are arranged so as to be operated by the plugs 46 and 47 when a restraining device is pushed home, the plugs entering corresponding sockets such as 36 and 37. The length of the plugs and the depth of the sockets are such as to ensure that the micro-switch contacts are closed only when the plugs are fully home in the sockets. In the interests of safety and of foolproof operation, the construction is such that there is no other way of operating the micro-switches.

The function of the micro-switches is to energise the electric circuitry of the motors in the trolley, the motors then being controlled from the cradle by a number of push-buttons. These push-buttons operate a pulse sequence impulse system as described below and by the use of this system any required number of operations can be initiated, using only a three-core cable between the cradle and the trolley. This cable is arranged adjacent to one of the cables 34 and 35 and is wound onto a separate drum mounted in the trolley.

Figure 5:
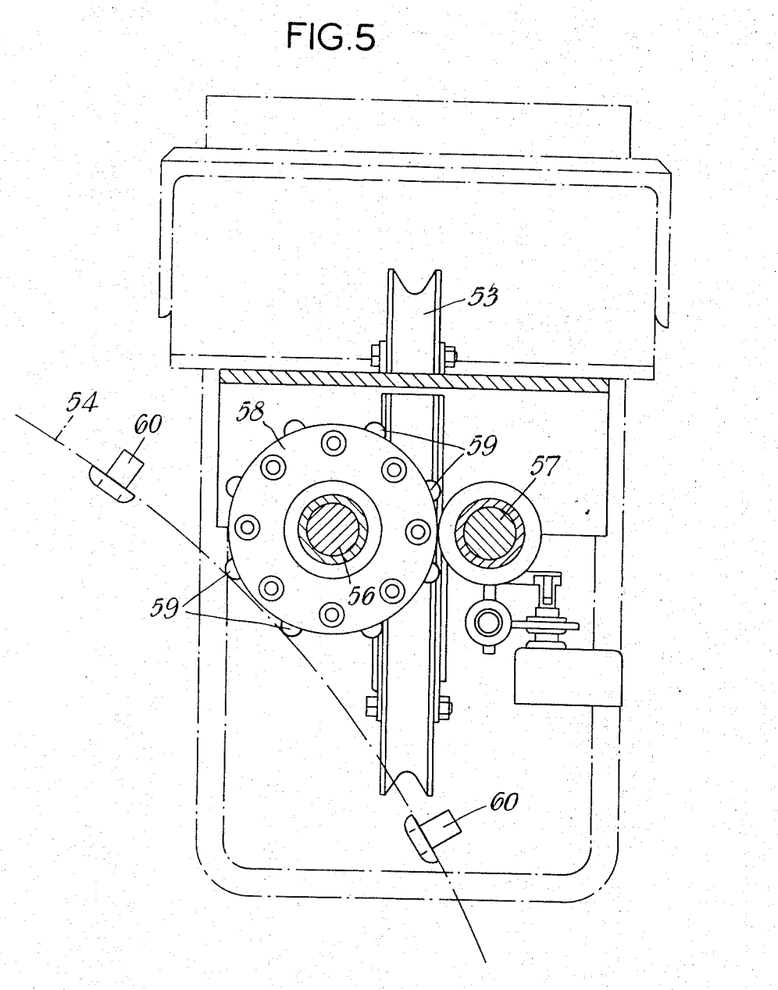
FIGURES 5, 6 and 7 are end, side and plan views, respectively, of the winding cable pulley mechanism in the trolley.
Figure 6:
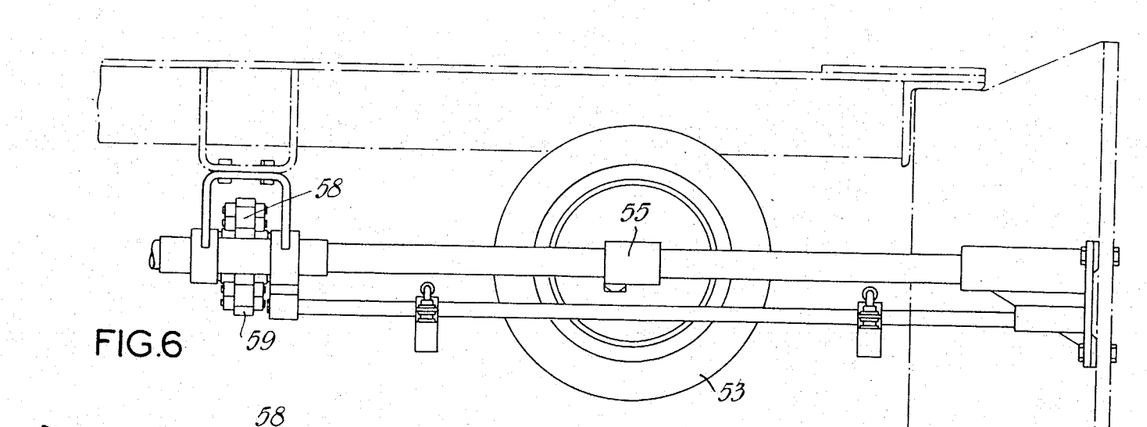
Figure 7:
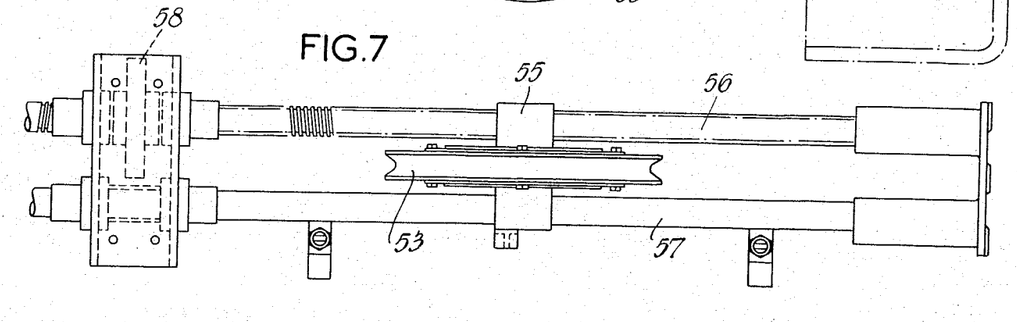

FIGURES 5, 6 and 7 show the mechanism for traversing and winding pulley 53. There are, of course, two such pulleys and the following description thus applies to two opposite-handed but otherwise identical mechanisms. A winding cable (not shown) passes from the winding drum 54 over the pulley 53 and thence out to a jib carried on the trolley. The pulley is carried on a traversing block or nut 55 having two holes, one of which is internally threaded and is engaged by a screwed shaft 56. A guide bar 57 passes through the other hole. One end of the shaft 56 carries a wheel 58 having on its circumference a number of projecting rollers such as 59. As the drum rotates these rollers are struck one after another by projections 60 attached to the outer surface of the drum 54, thus causing the wheel 58 and the screwed shaft 56 to rotate slowly as the drum rotates. The engagement of the screwed shaft in the nut 55 causes the pulley 53 to move longitudinally in a direction parallel to the axis of the drum. The parts are so dimensioned as to ensure that this movement is such as to maintain the length of cable between the drum and the pulley always in a position at right angles to the axis of the drum.

Figure 8:
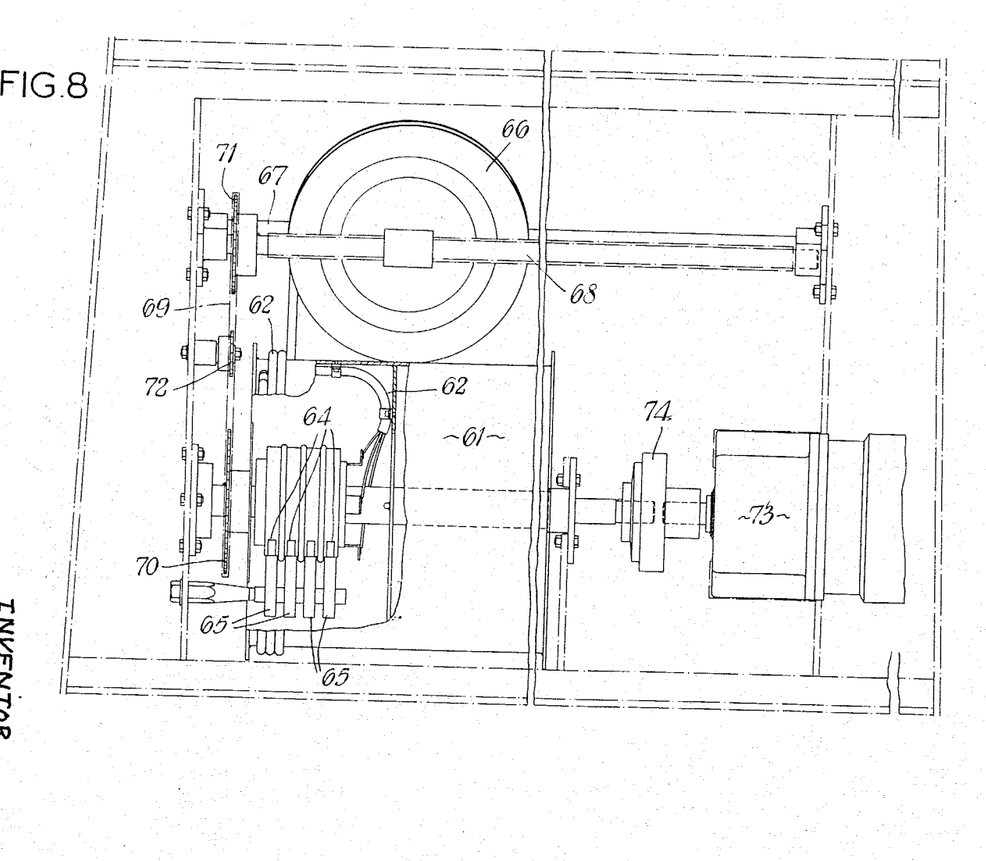
FIGURE 8 shows the arrangement of the electric cable winding drum and corresponding pulley.

FIGURE 8 shows a second winding drum 61, for the three-core electric cable 62. Current is led to this cable from a fixed cable 63 via slip rings 64 and brushes 65. The cable 62 passes over a traversing pulley 66 mounted on a plain shaft 67 and on a screwed shaft 68. In this case the screwed shaft is driven by a chain 69 passing over sprockets 70 and 71 attached respectively to the drum 61 and the screwed shaft 68. A chain tension adjuster is shown at 72.

The drum is rotated by a geared electric motor 73 through the medium of a slipping clutch 74. The torque which this clutch can transmit is insufficient to rotate the motor when the cradle is descending. When the cradle is ascending the clutch is also unable to transmit the full motor torque. The clutch thus slips whenever the cradle is moving upwards or downwards and the electric cable is thereby always kept taut.

Figure 9A:
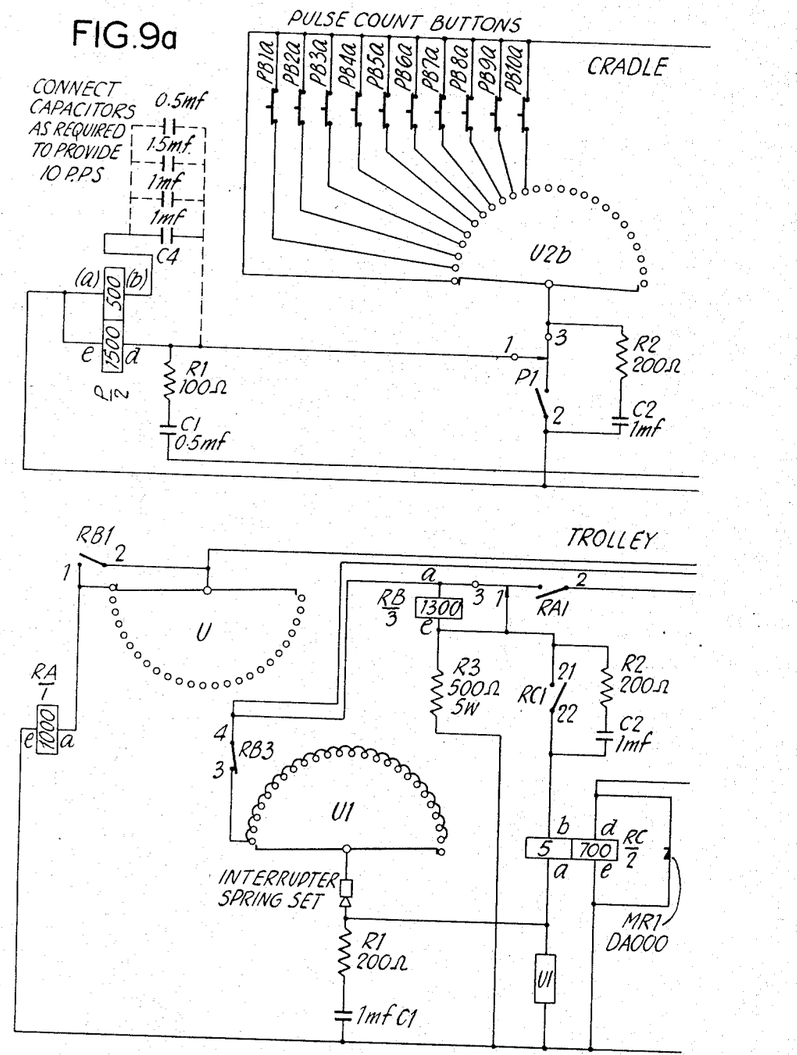
FIGURES 9a and 9b jointly show a circuit diagram of the electric pulse sequence impulse system.
Figure 9B:
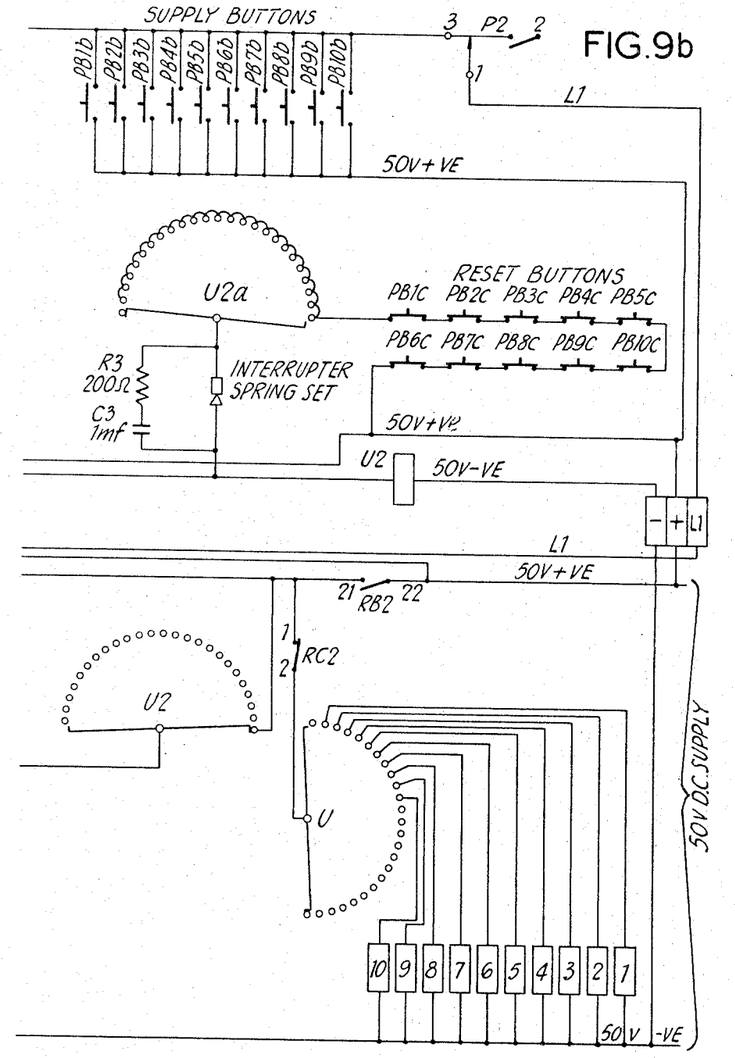

An embodiment of the electric pulse sequence impulse control system will now be described with reference to FIGURES 9a and 9b which jointly show a diagram of how a three-core cable can be used to initiate ten operations. The upper half of the diagram shows the equipment in the cradle and the lower half shows the corresponding equipment in the trolley. It will be understood that the three sets of push-buttons shown separately for clarity are in fact mechanically connected and operate as a single unit. The same consideration applies to the uniselectors in the cradle and also to the uniselectors in the trolley.

Positioned in the cradle is a push-button control station consisting in this instance of ten buttons. Each button is labelled distinctly with its function and is of a three-pole type.

The operator in the cradle selects the required button and holds that button as long as he requires the operation to continue. On release of the button, the operation ceases and the system is automatically re-set for the next command signal from the operator.

The system operates on a 50 v. DC supply provided by a suitable rectifier unit which is situated in the trolley with the receiving equipment.

For a typical operation of the circuit, a random push-button, say PB5, will be considered throughout this description, first considering the transmitter in the cradle and then the receiver in the trolley which will operate the required contactor for control.

On depressing PB5, contact PB5b closes and passes a supply through uniselector bank U2b to the pulse generator P/2. The generator commences to pulse at approximately 10 p.p.s. and on each pulse a circuit is made via relay contact P1 to uniselector coil U2. This pulsing causes the uniselector to step around until the supply is cut off at bank U2b by the wiper coming in contact with stud number 6 which is connected to PB5a. As PB5a is in open circuit on depression of the button, this decides the pulse count required, i.e., 5 distinct pulses are generated.

Contact P2 is the second contact on the pulse generator and will also pulse at approximately 10 p.p.s. when the generator is in operation. This contact is connected directly in the signal line L1 to the receiver, and is supplied via PB5b. As this button is held on during the operation, a steady supply is fed to the receiver after the pulsing sequence is completed. This ensures that the operating contactor in the trolley will continue to hold as long as the button is being depressed and therefore satisfies the condition of a "Dead Man's Control."

The third and final contact of the push button PB5c is incorporated for the resetting or homing sequence. This contact is opened on depression of the button and therefore open circuits the interrupter spring set via U2a. On releasing the button, the homing circuit is completed and the uniselector resets for the next operation.

The receiver, on accepting the first pulse through line L1 energizes relay RA/1 via uniselector bank U1b and causes contacts RA1 to change over thus bringing into circuit relay RB/3. At this instant contact RB1 closes thus shorting out U1b, contact RB3 opens and contact RB2 closes. On closing RB2 a circuit is made to relay RC/2 via uniselector bank U1c which in turn closes RC1 and opens RC2.

With this sequence now set up on receiving the first pulse, the pulse drops off and relay RA/1 responds by becoming de-energised. This however does not apply to relays RB/3 or RC/2 as they are both slow to release and therefore remain saturated during the pulse absent period (providing that the pulse frequency is maintained at approximately 10 p.p.s.). Relay RA/1 now continues to pulse in sympathy with the pulse generator in the transmitter and therefore contact RA1 makes and breaks the circuit to the uniselector coil U1 via relay RC/2. The uniselector then commences to step around to take up a position determined by the pulse count and thus sets up bank U1d to the required auxiliary relay. This relay is at present in open circuit by contact RC2.

After the selected pulse count has been accomplished, relay RA is permanently energised, thus breaking the supply to RC/2 via contact RA1. Relay RC will then drop out and contact RC2 completes the circuit to the appropriate auxiliary relay which in turn energises the contactor required for operation.

The control is completed when the supply to relay RA from the transmitter ceases and RA becomes re-energised. This action returns relay RB/3 to normal and closes contact RB3 which in turn supplies the uniselector homing bank U1e and resets the system for the next operation.

At the instant of RB/3 becoming de-energised, contact RB2 opens circuit to the auxiliary relays and therefore the controlling contactor drops out.

The basis of the above described circuit is a pulse sequence of approximately 10 p.p.s. but this can be adjusted to suit other frequencies above or below this datum for more rapid or delayed operations as required with minor component changes.

I claim:

1. A cable-suspended cradle system for a building, the system comprising a cradle, a suspension cable fixedly attached to said cradle, a plurality of cable-restricting first attachment elements through which said cable passes and which are adapted to stack one upon another on said cable, and a series of complementary second attachment elements fixedly-mounted and vertically-spaced in the face of said building each for complementary engagement and disengagement with one of said cable-restricting first attachment elements.

2. A cable system according to claim 1 comprising an electric motor driven winding drum for said cable and electrical control means for said electric motor, said control means including electrical contact means operated in consequence of said engagement or disengagement of said first and second attachment elements so that said motor is energized for descent of said cradle only when said cradle is below the lowest pair of said attachment elements which are for the time being engaged one with another and so that said motor is de-energized when the cradle has descended to a position allowing the engagement of that pair of attachment elements of which said second element is next below said lowest pair of already engaged attachment elements.

3. A cradle system according to claim 2 comprising a track along the upper margin of said building, a trolley on said track and supporting said cable winding drum, and an electric motor in said trolley and drivingly connected therewith for traversing said trolley along said track.

4. A cradle system according to claim 3 in which each of said first attachment elements is in the form of a plug and each of said second attachment elements is in the form of a socket.

5. A cradle system according to claim 4 comprising electrical contact means for the control of said traversing electric motor and the further control of said cable-winding electric motor, said further electrical contact means comprising a wander plug carried in said trolley and a row of horizontally-spaced sockets in the face of said building and within the reach of the occupants of the cradle when the cradle is at its highest point so that the operation of said traversing motor is prevented by the engagement of said wander plug in any one of said horizontally-spaced sockets and the operation of said cable-winding motor is prevented by the disengagement of said wander plug.

6. A cradle system according to claim 5 comprising push buttons carried in said cradle for the operation of said cable-winding motor.

7. A cradle system according to claim 6 comprising means in each of said attachment plugs for preventing its disengagement from a socket by any force exerted on said plug by said cable.

8. A cradle system according to claim 7 comprising a microswitch connected with each of said sockets, said microswitch being adapted for operation when one of said plugs is fully inserted in said socket.

9. A cradle system according to claim 8 comprising two spaced cables and having said sockets in the face of the building arranged in similarly placed pairs.

10. A cradle system according to claim 9 comprising a series of bars adapted to stack one upon another in said cradle, each of said bars carrying a pair of said plugs arranged for engagement with a corresponding pair of said sockets.

11. A cradle system according to claim 9 comprising a three-core electric cable between said cradle and said trolley, and a pulse sequence impulse system for initiating any required number of operations by operating said push buttons.

12. A cradle system according to claim 11 comprising a separate winding drum mounted in said trolley, said three-core cable being wound onto said separate winding drum.

13. A cradle system according to claim 12 comprising two pulleys mounted in said trolley over each of which passes one of said pair of spaced cables on leaving said first mentioned winding drum, and means for traversing said pulleys as said drum rotates so that the run of each of said pair of cables extending between said drum and the corresponding pulley is always substantially at rightangles to the axis of rotation of said winding drum.

14. A building incorporating a cradle system according to claim 13.

References Cited

UNITED STATES PATENTS

| | | | |
|---|---|---|---|
| 3,130,813 | 4/1964 | Fackler | 182—36 |
| 3,159,110 | 12/1964 | Wylie | 182—36 |
| 3,237,718 | 3/1966 | Pearson | 182—36 |

REINALDO P. MACHADO, *Primary Examiner.*